United States Patent [19]

Ringot et al.

[11] Patent Number: 5,009,115
[45] Date of Patent: Apr. 23, 1991

[54] DEVICE FOR DRIVING IN ROTATION A STRUCTURE OF LARGE DIAMETER PARTICULARLY AN ANTENNA

[75] Inventors: Patrice Ringot, Grenoble; Parendel Marc, Moirans, both of France

[73] Assignee: Neyrpic Framatome Mecanique, Paris la Defense, France

[21] Appl. No.: 491,174

[22] Filed: Mar. 9, 1990

[30] Foreign Application Priority Data

Mar. 10, 1989 [FR] France .................................. 89 03431

[51] Int. Cl.[5] .................. F16H 27/020; F16H 57/020; F16M 11/120; H01Q 3/000
[52] U.S. Cl. .............................. 74/89.150; 74/606 R; 74/665 C; 248/183; 343/766
[58] Field of Search ............... 343/766, 761, 757, 878, 343/880, 882; 248/183, 185, 186; 74/89.15, 665 C, 606 R; 901/28

[56] References Cited

U.S. PATENT DOCUMENTS

| 3,059,889 | 10/1962 | Pottmeyer | 248/183 |
| 3,515,009 | 6/1970 | Matusch et al. | 74/128 |
| 4,295,621 | 10/1981 | Siryj | 248/183 |
| 4,691,207 | 9/1987 | Timineri | 343/766 |

FOREIGN PATENT DOCUMENTS

| 1183482 | 7/1959 | France | 343/766 |
| 0136401 | 7/1985 | Japan | 343/878 |

*Primary Examiner*—Michael C. Wimer
*Assistant Examiner*—Peter Toby Brown
*Attorney, Agent, or Firm*—Dowell & Dowell

[57] ABSTRACT

An apparatus for rotating structures such as large antennas which incorporates a motor for controlling rapid roatation of the structure through a ring gear and a screw jack which is selectively coupled to the ring gear for controlling a slower more exacting rotation of the structure about a common axis.

12 Claims, 7 Drawing Sheets

DEVICE FOR DRIVING IN ROTATION A STRUCTURE OF LARGE DIAMETER PARTICULARLY AN ANTENNA

BACKGROUND OF THE INVENTION

Field of the Invention

This device is directed to devices for rotatably adjusting such structures as antennas used in satellite communications.

It is known that antennas for communication with satellites must be able to scan a demi-sphere centered on the vertical axis of a fixed pedestal. To that end, it is necessary to combine movement along two planes, the first in azimuth, or in a horizontal plane, the second in elevation, i.e. in a vertical plane.

For average structures, namely those with a diameter less than or equal to 13 meters, the movement in elevation is obtained by a jack which allows the antenna to pivot through about 90°, while the movement in azimuth is obtained by two gear motors on the shafts of which are fixed pinions which mesh with a fixed ring gear whose diameter is about 1.5 meter. The gear motors, which are normally adjustable, are disposed symetrically and are secured to the assembly rotating with the antenna. The gear motors allow rapid movements (homing mode to change aiming) and slow movements (tracking mode).

When antennas are employed whose diameter is greater than or equal to 16 meters, the movement in elevation is still obtained by a jack as for the average structures, but the movement in azumith, made by two gear motors, requires a ring gear of large diameter (about 4 meters) in order to maintain structural rigidity taking into account the increase in mass. This is both expensive and cumbersome, with the result that the solution adopted consists in a configuration with mean clearance allowing displacements by bounds of 60° with an overlap of 30°.

This configuration with mean clearance is hardly more satisfactory than that using a large-diameter ring gear.

SUMMARY OF THE INVENTION

The improvements forming the subject matter of the present invention overcomes the aforementioned drawbacks and allow a device to be produced which ensures a displacement in azimuth with large clearance continuously, i.e. of the order of 340°, with a ring gear of reduced diameter.

According to the invention, in order to effect the rapid movements of the structure, a gear motor is used whose pinion meshes with the ring gear, while, for slow movements, the gear motor is at rest, while the displacement of the structure through a relatively small angle (more or less 18°) is effected by means of a jack acting on the ring gear by way of a carriage provided with a disengageable positive coupling system.

BRIEF DESCRIPTION OF THE DRAWINGS

The accompanying drawings, given by way of example, will enable the invention, the characteristics that it presents and the advantages that it is capable of procuring, to be more readily understood.

DESCRIPTION OF THE PREFERRED EMBODIMENT

Figure 1:
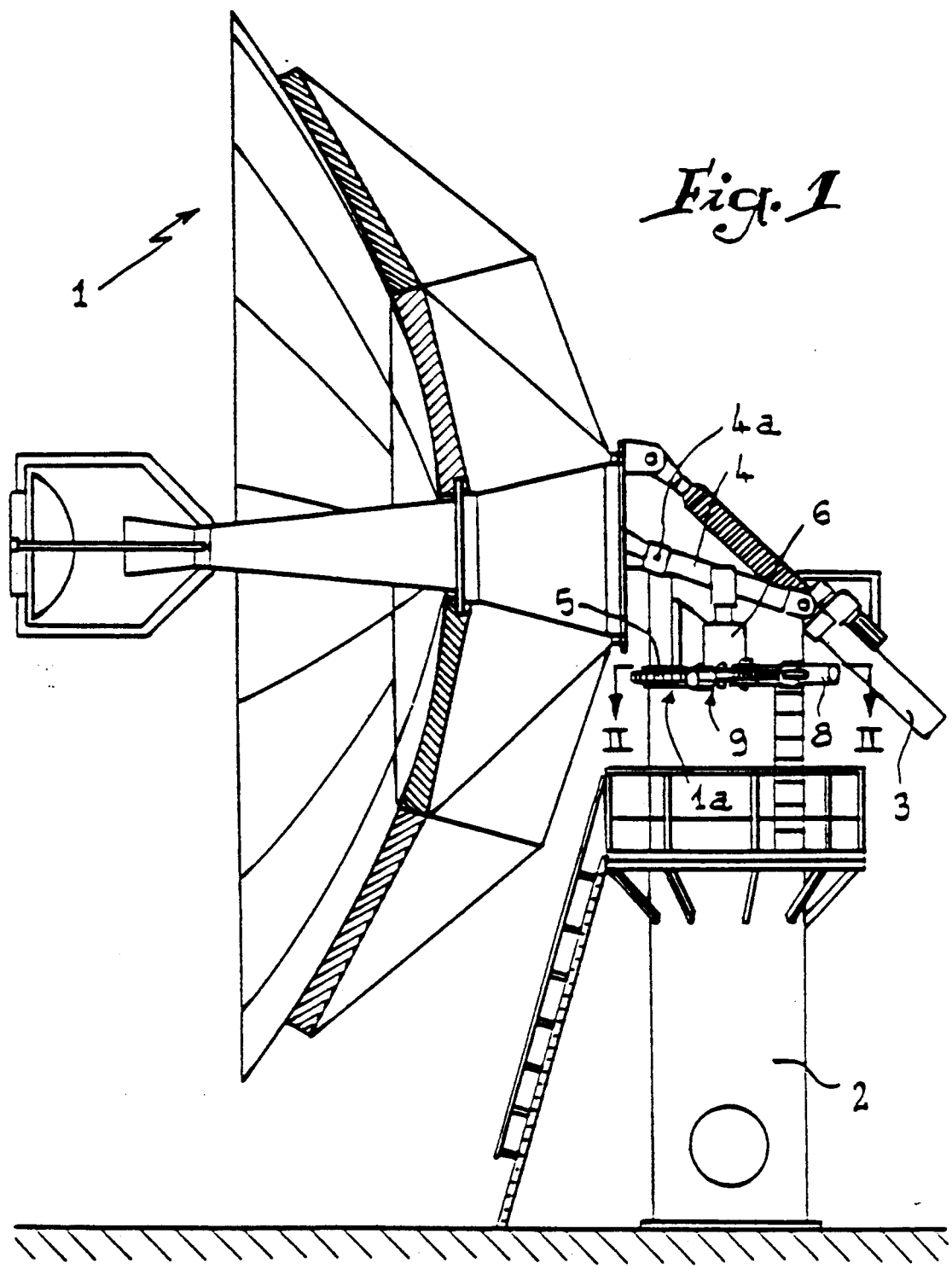
FIG. 1 is a view in elevation of a structure to which the improvements according to the invention are applied.
Figure 2:
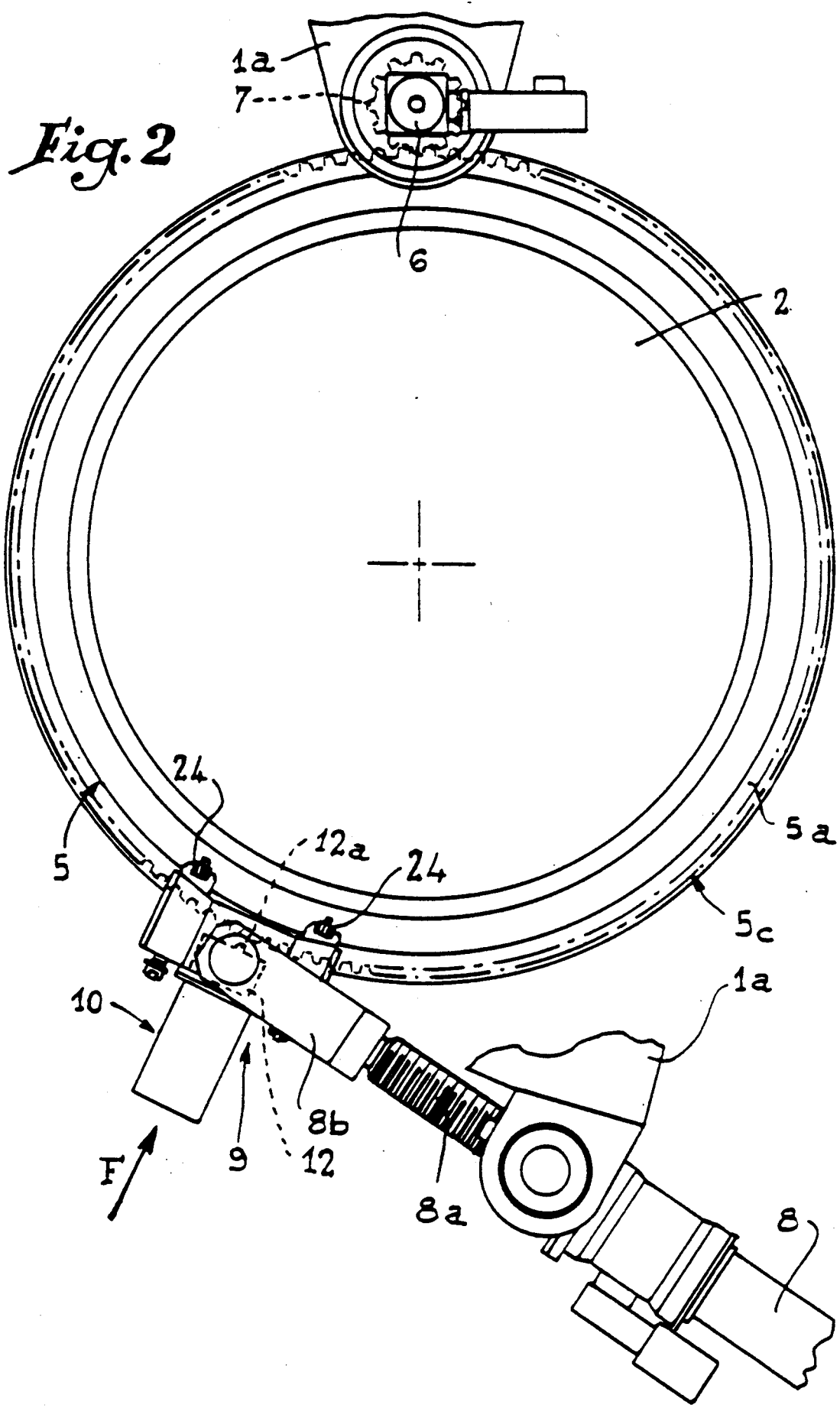
FIG. 2 is a section taken along II—II (FIG. 1).

FIG. 1 shows a parabolic antenna 1 with a diameter larger than 16 meters and which is mounted to rotate with respect to a fixed pedestal 2. Antenna 1 is mounted on a base 1a. It may pivot with respect to its base 1a by means of a screw jack 3 and an assembly 4 simulating a pivot axis 4a. The pedestal includes a fixed ring gear 5 while the base 1a of the antenna is provided, on the one hand, with a reversible gear motor 6 on the driven shaft of which is fixed a pinion 7 (FIG. 2) meshing with the ring gear 5. The base 1a also includes a screw jack 8 of which the end of the piston 8a in a form of a screw is associated with a carriage 9 which carries a positive coupling system 10. As illustrated in FIG. 2, the cylinder of jack 8 is articulated about a vertical pin carried by the lug 4a which is secured to base 1a of the antenna 1.

Figure 3:
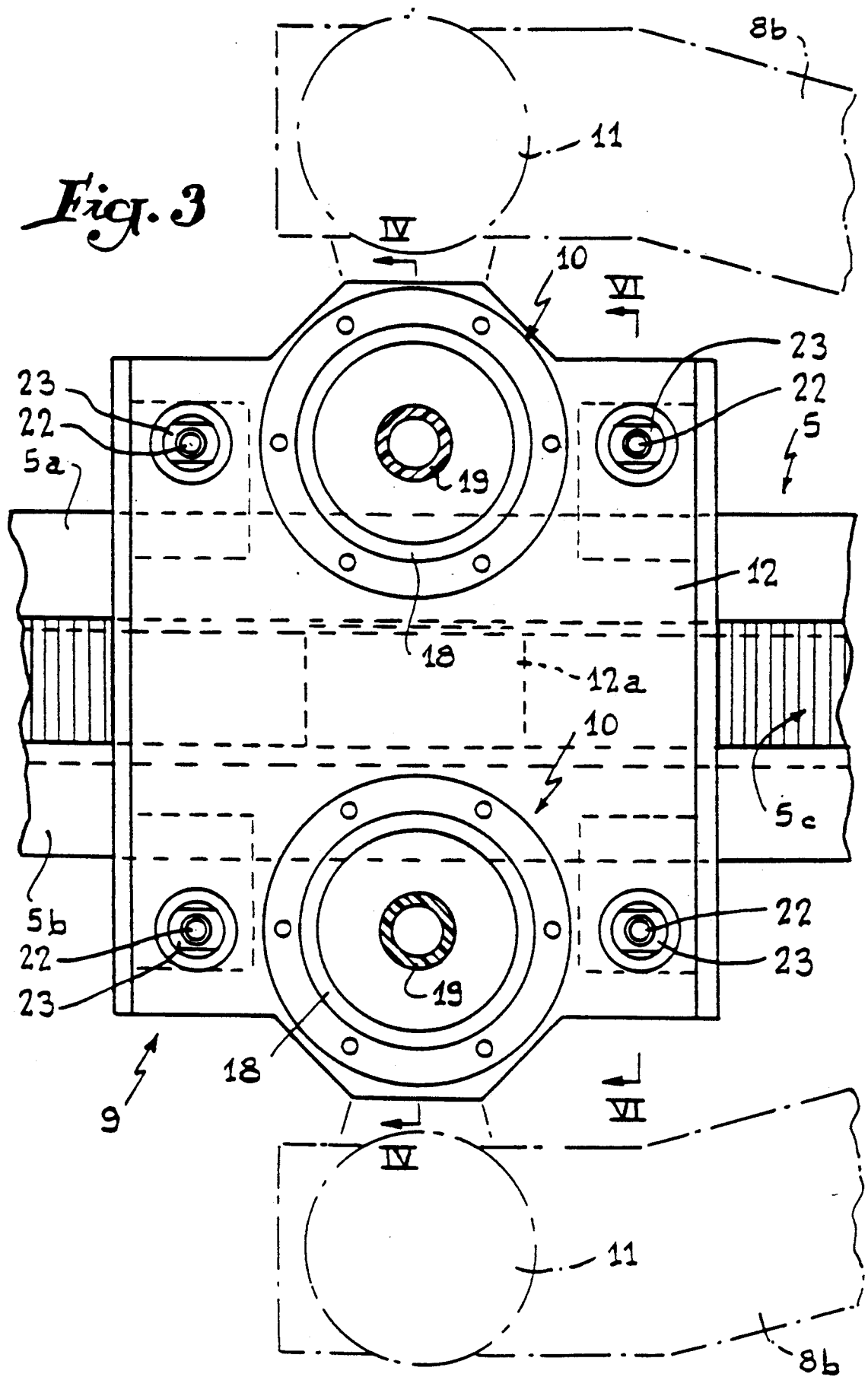
FIG. 3 is a view in direction F (FIG. 2) of the carriage bearing the positive coupling system.

FIG. 3 illustrates the carriage 9 which comprises, on its upper and lower faces, a ball joint 11 associated with the corresponding branch of a fork 8b which is integral with the free end of the piston 8a.

Figure 4:
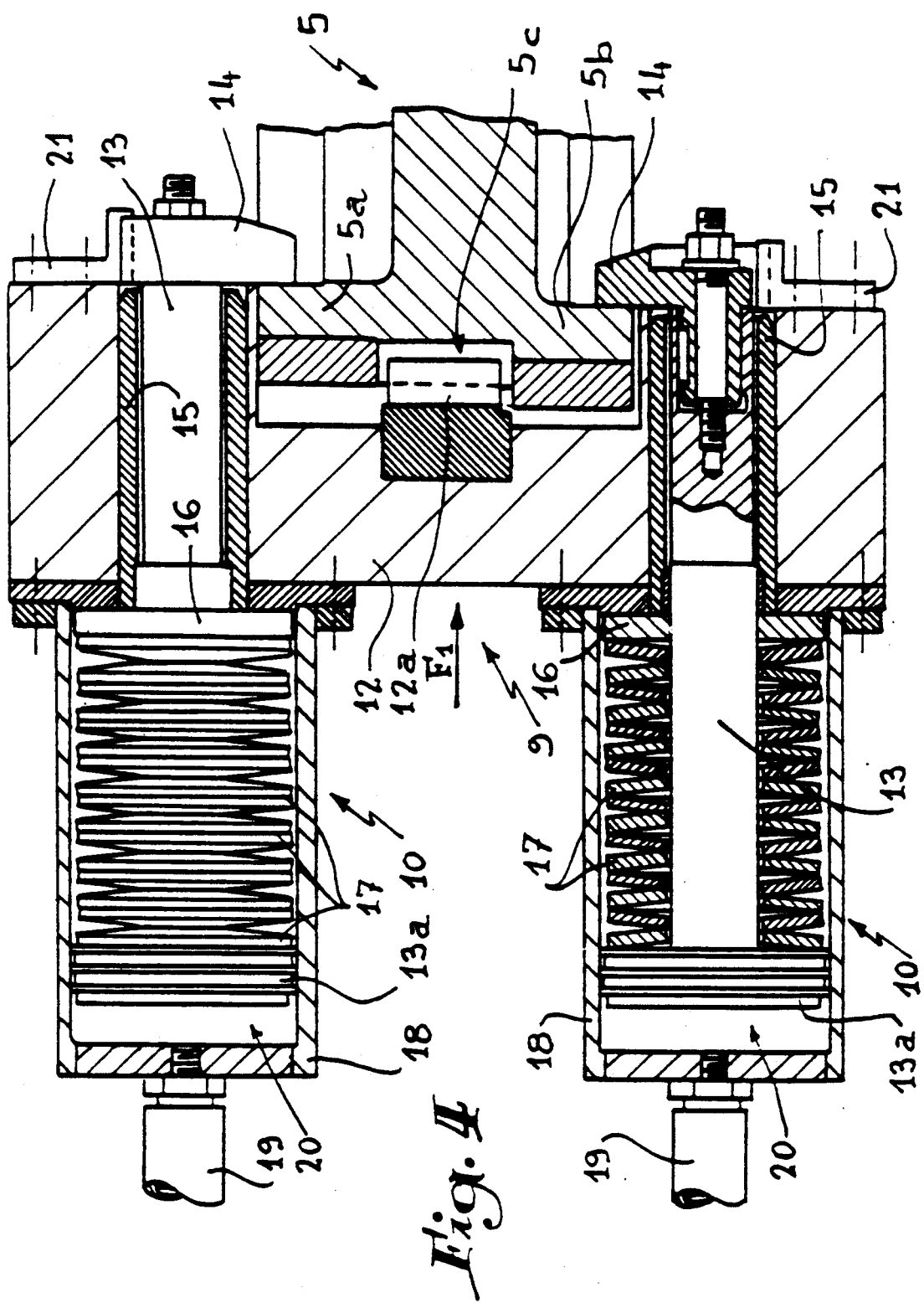
FIG. 4 is a section along IV—IV (FIG. 3) illustrating the positive coupling system in position engaged with the ring gear.
Figure 5:
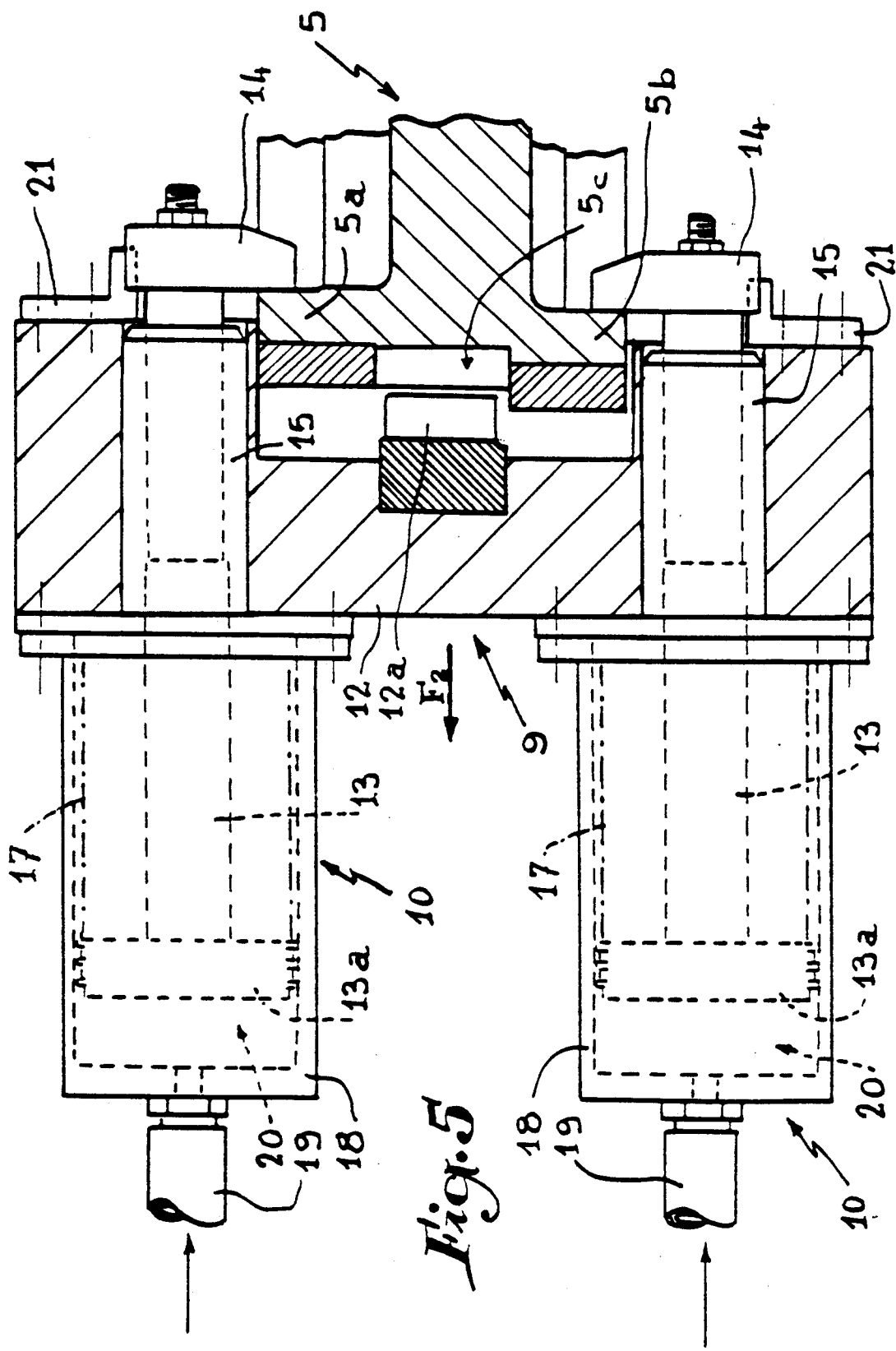
FIG. 5 is a view similar to that of FIG. 4, but illustrating the positive coupling system in its disengaged position.

Carriage 9 comprises a body 12 made in the form of a thick plate which is mounted to slide with respect to two tie-rods 13 illustrated in FIGS. 4 and 5. One of the ends of each tie-rod 13 is provided with a shoe 14 abutting against the inner face of two collars 5a, 5b which are upstanding above and below the periphery of the ring gear 5, on either side of its teeth 5c.

Each tie-rod 13 passes through a lining 15 fixed within the body 12 and includes a head 13a. Between the head 13a at its opposite end and a washer 16 in abutment against 12 are placed elastic washers 17, with the result that body 12 is urged in the direction of arrow F1, so that a tooth 12a made in the center of body 12 is positively fitted in the teeth 5c of the ring gear 5.

Each head 13a is disposed in a cylinder 18 fixed to the lining 15 and which is supplied with fluid under pressure through a pipe 19, with the result that, when fluid enters this pipe, the chamber 20, constituted between the bottom of the cylinder 18 and the head 13a which bears peripheral O-rings, is placed under pressure for a purpose which will be explained in greater detail hereinbelow.

The presence is observed of a guiding system 21 fixed on body 12 and extending into a slot in each shoe 14 to guide the shoe and to block their rotation.

Figure 6:
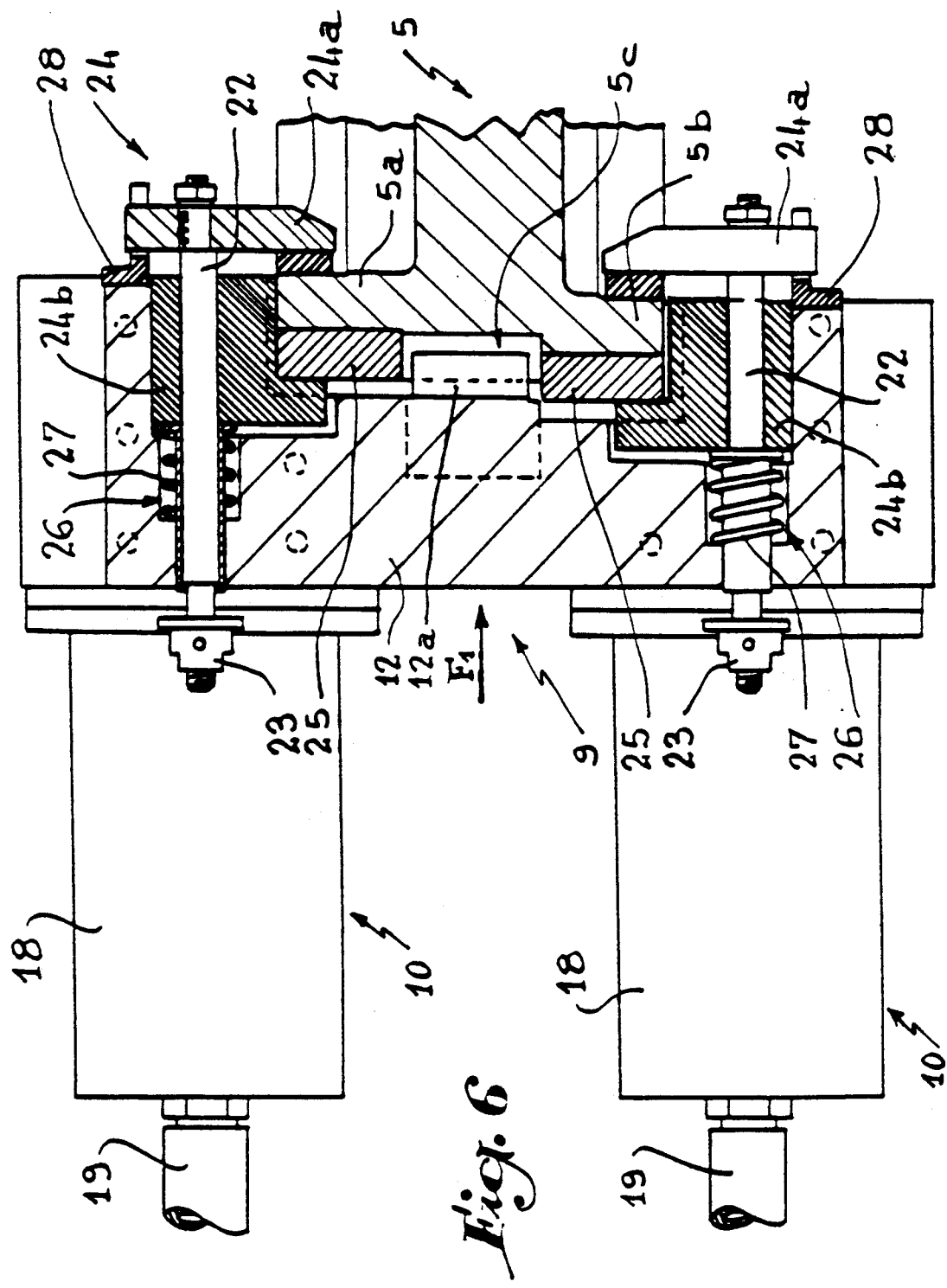
FIG. 6 is a section along VI—VI (FIG. 3) in the positive coupled position.
Figure 7:
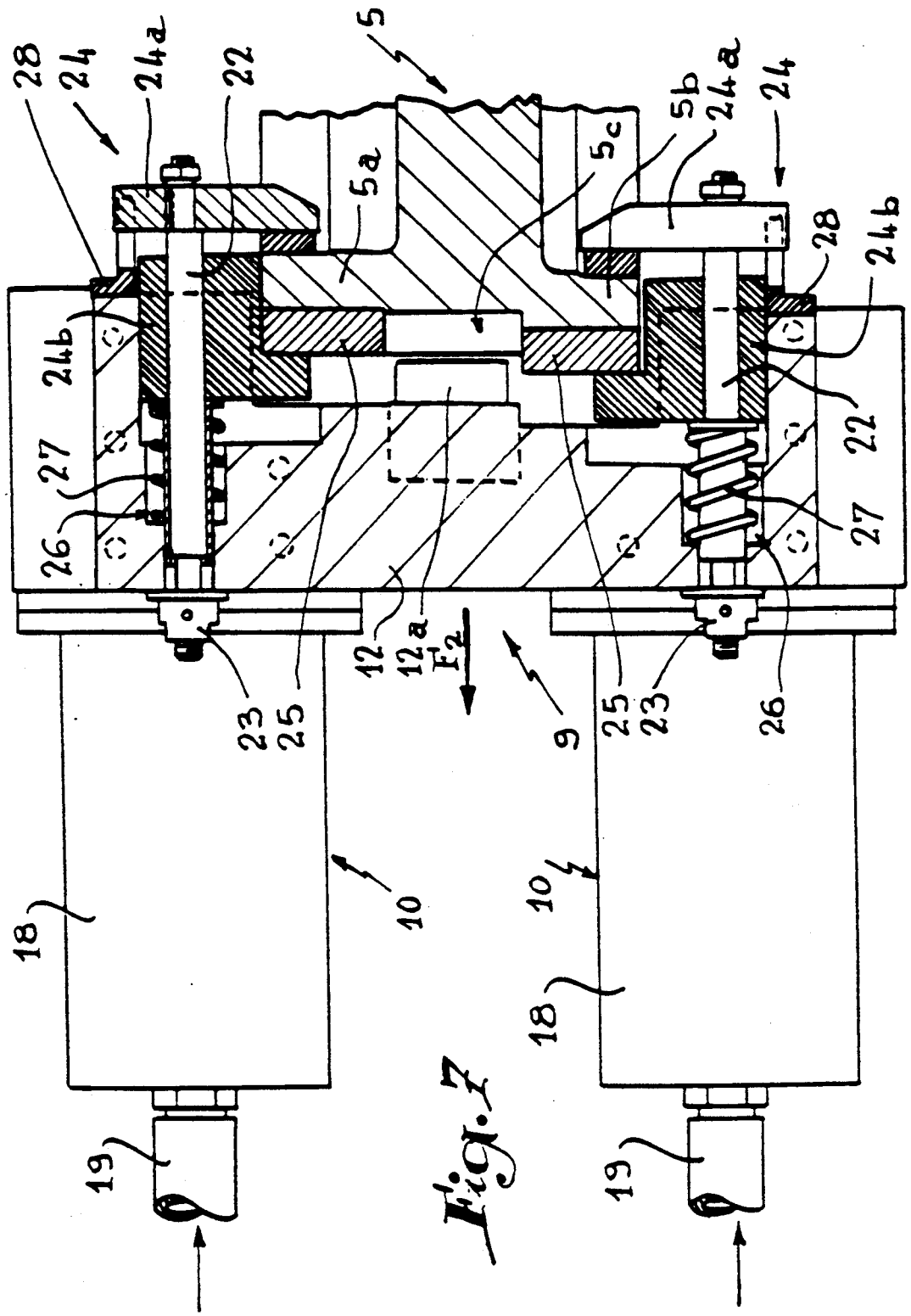
FIG. 7 is a view similar to that of FIG. 6, but showing the positive coupling system in disengaged position.

Body 12 is further provided with four rods 22 which pass right through it (FIGS. 6 and 7). One of the ends of each rod 22 is provided with a fixed stop 23, while its opposite end carries a pad 24 which overlaps each collar 5a, 5b of ring gear 5. Each pad is composed of two independent elements of which one, 24a, which is fixed to the relevant end of rod 22, is in abutment against the inner face of the corresponding collar 5a, 5b, while the other element 24b of the pad is mounted to slide freely on rod 22. This second element 24b is in contact with the horizontal face of the corresponding collar and with the collars external face by way of a hoop 25. Contact between element 24b and collar 5b is obtained with the aid of an elastic abutment. Body 12 includes around each rod 22 a chamber 26 in which is placed a compression spring 27 which abuts against the bottom of the chamber and the element 24b.

Functioning follows from the foregoing explanations.

When fluid is sent into pipe 19 (FIG. 5) under a pressure sufficient to overcome the force developed by the elastic washers 17, the force is cancelled, with the result that the springs 27 cause body 12 to move in the direction of arrow F2 (FIGS. 5 and 7) until it comes to rest against the four stops 23. This displacement of body 12 disengages tooth 12a from tooth 5c in which it was previously locked.

This position is adopted when the gear motor 6 must change the angular orientation of antenna 1.

On the contrary, for a slow, so-called tracking displacement, the pressure is cut in pipes 19 with the result that locking of the tooth and of the ring gear is effected by action of elastic washers 17. In this way, operation of jack 8 brings about a slow rotation of the antenna in one direction or in the other, depending on whether screw 8a rotates in one direction or in the opposite one.

It is observed that elements 24a of pads 24 are, like shoes 14, guided by angle irons 28.

It must, moreover, be understood that the foregoing description has been given only by way of example and that it in no way limits the domain of the invention which would not be exceeded by replacing the details of execution described by any other equivalents.

We claim:

1. An apparatus for rotating a structure such as an antenna wherein the structure is mounted to a support pedestal having a ring gear mounted therebetween and wherein the ring gear includes a plurality of teeth comprising, a first adjustment means including a motor having a drive shaft, pinion means mounted to said drive shaft and engaging said teeth of said ring gear so as to rapidly rotate the structure about an axis taken through the ring gear when said motor is activated, a second adjustment means for enabling a slower exacting rotation of the structure about said axis, said second adjustment means including a jack means having an extensible member, a coupling member carried by said extensible member, said coupling member including shiftable engaging means for selectively engaging said teeth of said ring gear and for disengaging said coupling member from said ring gear in order to permit the rapid rotation of the structure by said first adjustment means.

2. The apparatus of claim 1 in which said first adjustment means rotates the structure continuously through an angle of approximately 340° about said axis.

3. The apparatus of claim 2 in which said second adjustment means rotates the structure through an angle about said axis which does not exceed approximately 18°.

4. The apparatus of claim 1 in which said shiftable engaging means of said coupling member includes a plate having at least one tooth extending outwardly therefrom, said tooth being relatively meshed between the teeth of said ring gear, said extensible member having an outer end portion, and connector means for pivotally connecting said plate to said outer end portion of said extensible member.

5. The apparatus of claim 4 in which said connector means includes a fork mounted to said outer end portion of said extensible member, said fork having upper and lower arms which are engagable with upper and lower ball joint means connected to said plate whereby said plate may be articulated between said arms of said fork.

6. The apparatus of claim 4 in which said coupling means includes first resilient means for normally urging said plate toward said ring gear.

7. The apparatus of claim 6 in which said coupling means includes at least one tie rod means extending through said plate and having first and second ends, shoe means carried by said first end of said tie rod means, said shoe means engaging said ring gear opposite said teeth, said first resilient means being mounted about said tie rod means and intermediate said second end thereof and said plate so as to normally exert a force between said second end of said tie rod means and said plate, a cylinder means enclosing said first resilient means and said second end of said tie rod means, and means for introducing fluid under pressure into said cylinder means so as to oppose the force of said first resilient means upon said second end of said tie rod means.

8. The apparatus of claim 7 including second resilient means for normally urging said plate away from said ring gear and being effective to move said plate to withdraw said at least one tooth from the teeth of said ring gear when fluid under pressure is introduced into said cylinder means.

9. The apparatus of claim 8 in which said extensible member is a screw rod.

10. The apparatus of claim 8 in which the ring gear includes upper and lower collars spaced from said gear teeth and wherein said second resilient means includes a plurality of rod means extending through said plate and having first ends connected to pad means which overlap said upper and lower collars of said ring gear and second ends having stop means mounted thereto, said plate being shiftable relative to said rod means and a spring means associated with each of said rod means and mounted between said plate means and said pad means for normally urging said plate away from said ring gear.

11. The apparatus of claim 10 in which each of said pad means include first and second portions which are mounted on opposite sides of said upper and lower collars and means for aligning each of said pad means and said shoe means relative to said ring gear.

12. The apparatus of claim 1 in which said extensible member is a screw rod.

* * * * *